United States Patent [19]

Kyrtsos et al.

[11] Patent Number: 5,359,521
[45] Date of Patent: Oct. 25, 1994

[54] METHOD AND APPARATUS FOR DETERMINING VEHICLE POSITION USING A SATELLITE BASED NAVIGATION SYSTEM

[75] Inventors: Christos T. Kyrtsos, Peoria; Adam J. Gudat, Edelstein; Douglas W. Friedrich, Pekin, all of Ill.

[73] Assignee: Caterpillar Inc., Peoria, Ill.

[21] Appl. No.: 983,697

[22] Filed: Dec. 1, 1992

[51] Int. Cl.$^5$ .......................... G01S 5/02; H04B 7/185
[52] U.S. Cl. .................. 364/449; 340/988; 342/357
[58] Field of Search ............... 364/449, 516, 439, 444, 364/424, 460; 342/352, 357, 457, 424; 340/988, 945

[56] References Cited

U.S. PATENT DOCUMENTS

| | | | |
|---|---|---|---|
| 4,613,864 | 9/1986 | Hofgen | 364/449 |
| 4,667,203 | 5/1987 | Counselman, III | 342/357 |
| 4,809,005 | 2/1989 | Counselman, III | 342/352 |
| 4,866,450 | 9/1989 | Chisholm | 342/410 |
| 4,870,422 | 9/1989 | Counselman, III | 342/357 |
| 4,894,655 | 1/1990 | Joguet et al. | 340/988 |
| 4,894,662 | 1/1990 | Counselman | 324/357 |
| 4,912,475 | 3/1990 | Counselman, III | 342/352 |
| 5,021,792 | 6/1991 | Hwang | 342/357 |
| 5,100,229 | 3/1992 | Lundberg et al. | 356/1 |
| 5,101,356 | 3/1992 | Timothy et al. | 364/449 |
| 5,119,102 | 6/1992 | Barnard | 342/357 |
| 5,155,490 | 10/1992 | Spradley, Jr. et al. | 324/357 |
| 5,185,610 | 2/1993 | Ward et al. | 342/357 |
| 5,252,982 | 10/1993 | Frei | 342/357 |

FOREIGN PATENT DOCUMENTS

0451520A2 of 0000 European Pat. Off. .
0518146 12/1992 European Pat. Off. .

OTHER PUBLICATIONS

Greenspan et al., "Accuracy of Relative Positioning By Interferometry With Reconstructed Carrier GPS: Experimental Results", Presented at Third International Symposium on Satellite Doppler Positioning, Las Cruces, N.M., Feb. 1982, CSDL-P-1486, pp. 1–19.
"Compensating For GPS Ephemeris Error", *NASA Tech Briefs*, Nov. 1992, pp. 56 and 58.
Van Graas et al., "Real-Time Attitude And Heading Determination Using GPS", *GPS World*, Mar. 1992, pp. 32–39.

Primary Examiner—Thomas G. Black
Assistant Examiner—Tan Q. Nguyen
Attorney, Agent, or Firm—Sterne, Kessler, Goldstein & Fox

[57] ABSTRACT

An apparatus and method for determining the position of a vehicle relative to the center of the Earth uses navigation signals from a satellite based navigation system which includes a plurality of satellites orbiting the Earth. In one embodiment, a plurality of antennas are mounted on the vehicle. The distance between the antennas is precisely known. This distance is used to constrain the solution of a vehicle position estimate to improve the accuracy of the position estimate. In another embodiment, a plurality of receiver systems are used in place of the plurality of antennas. In yet another embodiment, a plurality of base stations with known positions are used to constrain the solution of the vehicle position estimate.

7 Claims, 10 Drawing Sheets

METHOD AND APPARATUS FOR DETERMINING VEHICLE POSITION USING A SATELLITE BASED NAVIGATION SYSTEM

FIELD OF THE INVENTION

This invention relates generally to the field of navigation systems which use a constellation of Earth-orbiting satellites to determine the position of a receiver at or near the Earth's surface. More specifically, the invention relates to a method and apparatus for improving the accuracy of position estimates in such a satellite based navigation system.

BACKGROUND OF THE INVENTION

Several national governments, including the United States (U.S.) of America, are presently developing a terrestrial position determination system, referred to generically as a global positioning system (GPS). A GPS is a satellite-based radio-navigation system which is intended to provide highly accurate three-dimensional position information to receivers at or near the surface of the Earth.

The U.S. government has designated its GPS the "NAVSTAR." The NAVSTAR GPS is expected to be declared fully operational by the U.S. government in 1993. The government of the former Union of Soviet Socialist Republics (U.S.S.R.) is engaged in the development of a GPS known as "GLONASS". Further, two European systems known as "NAVSAT" and "GRANAS" are also under development. For ease of discussion, the following disclosure focuses specifically on the NAVSTAR GPS. The invention, however, has equal applicability to other global positioning systems.

In the NAVSTAR GPS, it is envisioned that four orbiting GPS satellites will exist in each of six separate circular orbits to yield a total of twenty-four GPS satellites. Of these, twenty-one will be operational and three will serve as spares. The satellite orbits will be neither polar nor equatorial but will lie in mutually orthogonal inclined planes.

Each GPS satellite will orbit the Earth approximately once every 12 hours. This coupled with the fact that the Earth rotates on its axis once every twenty-four hours causes each satellite to complete exactly two orbits while the Earth turns one revolution.

The position of each satellite at any given time will be precisely known and will be continuously transmitted to the Earth. This position information, which indicates the position of the satellite in space with respect to time (GPS time), is known as ephemeris data.

In addition to the ephemeris data, the navigation signal transmitted by each satellite includes a precise time at which the signal was transmitted. The distance or range from a receiver to each satellite may be determined using this time of transmission which is included in each navigation signal. By noting the time at which the signal was received at the receiver, a propagation time delay can be calculated. This time delay when multiplied by the speed of propagation of the signal will yield a "pseudorange" from the transmitting satellite to the receiver.

The range is called a "pseudorange" because the receiver clock may not be precisely synchronized to GPS time and because propagation through the atmosphere introduces delays into the navigation signal propagation times. These result, respectively, in a clock bias (error) and an atmospheric bias (error). Clock biases may be as large as several milliseconds.

Using these two pieces of information (the ephemeris data and the pseudorange) from at least three satellites, the position of a receiver with respect to the center of the Earth can be determined using passive triangulation techniques.

Triangulation involves three steps. First, the position of at least three satellites in "view" of the receiver must be determined. Second, the distance from the receiver to each satellite must be determined. Finally, the information from the first two steps is used to geometrically determine the position of the receiver with respect to the center of the Earth.

Triangulation, using at least three of the orbiting GPS satellites, allows the absolute terrestrial position (longitude, latitude, and altitude with respect to the Earth's center) of any Earth receiver to be computed via simple geometric theory. The accuracy of the position estimate depends in part on the number of orbiting GPS satellites that are sampled. Using more GPS satellites in the computation can increase the accuracy of the terrestrial position estimate.

Conventionally, four GPS satellites are sampled to determine each terrestrial position estimate. Three of the satellites are used for triangulation, and a fourth is added to correct for the clock bias described above. If the receiver's clock were precisely synchronized with that of the GPS satellites, then this fourth satellite would not be necessary. However, precise (e.g., atomic) clocks are expensive and are, therefore, not suitable for all applications.

For a more detailed discussion on the NAVSTAR GPS, see Parkinson, Bradford W. and Gilbert, Stephen W., "NAVSTAR: Global Positioning System—Ten Years Later," *Proceedings of the IEEE*, Vol. 71, No. 10, October 1983; and GPS: *A Guide to the Next Utility*, published by Trimble Navigation Ltd., Sunnyvale, Calif., 1989, pp. 1–47, both of which are incorporated herein by reference. For a detailed discussion of a vehicle positioning/navigation system which uses the NAVSTAR GPS, see commonly owned U.S. patent application Ser. No. 07/628,560, entitled "Vehicle Position Determination System and Method," filed Dec. 3, 1990, which is incorporated herein by reference.

In the NAVSTAR GPS, the electromagnetic signals from each satellite are continuously transmitted using a single carrier frequency. Each satellite, however, uses a different modulation gold code to allow differentiation of the signals. The carrier frequency is modulated using a pseudorandom signal which is unique to each GPS satellite. Consequently, the orbiting GPS satellites can be identified when the navigation signals are demodulated.

Furthermore, the NAVSTAR GPS envisions two modes of modulation for the carrier wave using pseudorandom signals. In the first mode, the carrier is modulated by a "C/A signal" and is referred to as the "Coarse/Acquisition mode". The Coarse/Acquisition or C/A mode is also known as the "Standard Positioning Service". The C/A signal is a gold code sequence having a chip rate of 1.023 MHz. Gold code sequences are known in the art.

A chip is one individual pulse of the pseudorandom code. The chip rate of a pseudorandom code sequence is the rate at which the chips in the sequence are generated. Consequently, the chip rate is equal to the code repetition rate divided by the number of members in the code. With respect to the C/A mode of the NAVSTAR GPS, there exists 1,023 chips in each gold code sequence and the sequence is repeated once every millisecond. Use of the 1.023 MHz gold code sequence from four orbiting GPS satellites enables the terrestrial position of an Earth receiver to be determined to an approximate accuracy of within 60 to 100 meters (with 95% confidence).

The second mode of modulation in the NAVSTAR GPS is commonly referred to as the "precise" or "protected" (P) mode. In the P-mode, the pseudorandom code has a chip rate of 10.23 MHz. Moreover, the P-mode sequences are extremely long, so that the sequences repeat no more than once every 267 days. As a result, the terrestrial position of any Earth receiver can be determined to within an approximate accuracy of 16 meters (spherical error probable). The P-mode is also known as the "Precise Positioning Service".

The P-mode sequences are held in secrecy by the United States government and are not made publicly available. The P-mode is intended for use only by Earth receivers specifically authorized by the United States government. Thus, the P-mode modulated data is generally not available so that many GPS users must rely solely on the GPS data provided via the C/A mode of modulation. This relegates most users to a less accurate positioning system.

The clock and atmospheric errors discussed above add to the inaccuracy of the positioning system. Other errors which affect GPS position computations include receiver noise, signal reflections, shading, and satellite path shifting (e.g., satellite wobble). These errors result in computation of incorrect pseudoranges and incorrect satellite positions. Incorrect pseudoranges and incorrect satellite positions, in turn, lead to a reduction in the precision of the position estimates computed by a vehicle positioning system. A differential system will compensate for many of these errors. However, a residual inaccuracy will still be present.

It is desirable to compute a vehicle position to within one meter of accuracy. However, this accuracy has not been possible with conventional differential systems using C/A code and with single- or open-ended (i.e., non-differential) GPS systems. The present invention seeks to overcome this limitation and to provide a navigation system with greater positioning accuracy.

SUMMARY OF THE INVENTION

The invention is a method and apparatus for improving the accuracy of vehicle position estimates from a satellite based vehicle navigation system (NAVSTAR GPS). In a first embodiment, a plurality of antennas are mounted on a vehicle. The distance between the antennas is precisely known. Each antenna receives navigation signals from the GPS satellites. Based on the navigation signals, a receiver computes a pseudorange to each antenna and a position of each satellite. The pseudoranges and satellite positions are then used to compute a position estimate for the vehicle. The distance between the antennas is used to constrain the solution for the position estimate to improve its accuracy.

In another embodiment, a plurality of receiver systems are mounted on the vehicle to receive the satellite navigation signals. Each receiver system computes a pseudorange and a satellite position for each satellite. The pseudoranges, satellite positions, and the distance between the receiver systems are then used to compute a position estimate for the vehicle.

The method of the invention for computing a vehicle position estimate includes the following steps:

(1) receiving navigation signals from each of a plurality of satellites at an antenna (or receiver system) coupled to the vehicle;

(2) receiving the navigation signals from each of the plurality of satellites at a second antenna (or receiver system) coupled to the vehicle, the second antenna being separated from the first antenna by a distance $\delta$;

(3) computing, for each antenna, a satellite position and a corresponding pseudorange for each satellite using the navigation signals; and (4) computing a position of the vehicle relative to the center of the Earth from the satellite positions, the pseudoranges, and the distance $\delta$ between said first and second antennas (or receiver systems).

It should be noted that the data from the two antennas/receivers used in the position computation need not be time synchronized. That is, the data from one antenna/receiver could be older than the data from the other receiver.

In another embodiment of the invention, a plurality of base stations having known positions are used to precisely determine the position of the vehicle using the GPS navigation signals and a triangulation technique between the base stations and the vehicle. For example, one method for practicing this embodiment of the invention includes the following steps:

(1) receiving navigation signals from each of a plurality of satellites at an antenna coupled to the vehicle;

(2) computing, using said navigation signals received at the vehicle, an estimated position of the vehicle;

(3) receiving the navigation signals from each of the plurality of satellites at a base station having a known position;

(4) computing, using the navigation signals received at the base station, a satellite position and a pseudorange for each satellite;

(5) transmitting, to the vehicle from the base station, the satellite positions and the pseudoranges (alternatively, the ephemeris data could be transmitted to the vehicle and the satellite positions could be at the vehicle);

(6) receiving the satellite positions and the pseudoranges at the vehicle;

(7) computing an estimated distance between the base station and the vehicle using the estimated position of the vehicle and the satellite positions and pseudoranges received from the base station;

(8) repeating steps (3)–(7) for a second base station to yield a second estimated distance between the second base station and the vehicle;

(9) repeating steps (3)–(7) for a third base station to yield a third estimated distance between the third base station and the vehicle; and

(10) computing, using a triangulation technique, a precise position estimate for the vehicle using the first distance and a known position for the first base station, the second distance and a known position for the second base station, and the third distance and a known position for the third base station.

The invention produces more precise vehicle position estimates.

DESCRIPTION OF THE PREFERRED EMBODIMENT

The present invention is now described with reference to the figures where like reference numbers denote like elements/steps.

Figure 1:
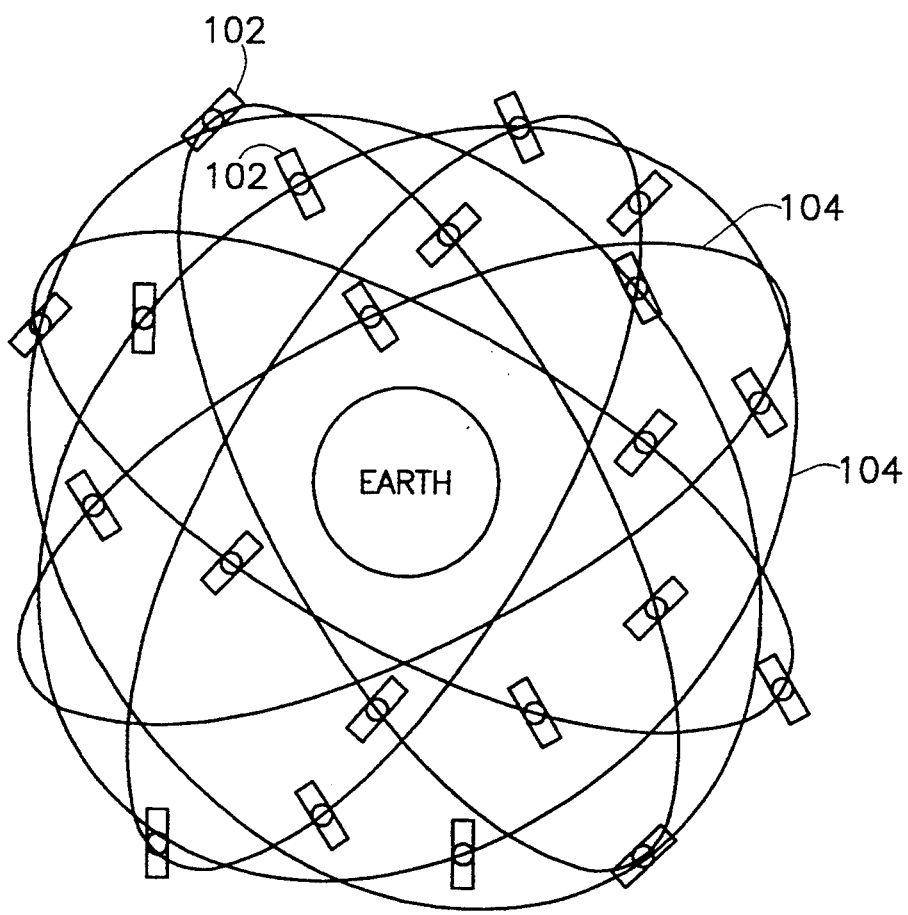
FIG. 1 is a diagram depicting the NAVSTAR GPS satellites in their respective orbits around the Earth.

The invention is a method and apparatus for determining the position of a vehicle using a satellite based navigation system. In the preferred embodiment, the NAVSTAR Global Positioning System (GPS) is used. As discussed above and illustrated in FIG. 1, the NAVSTAR GPS includes twenty-one operational satellites 102 which orbit the Earth in six orbits 104.

Figure 2:
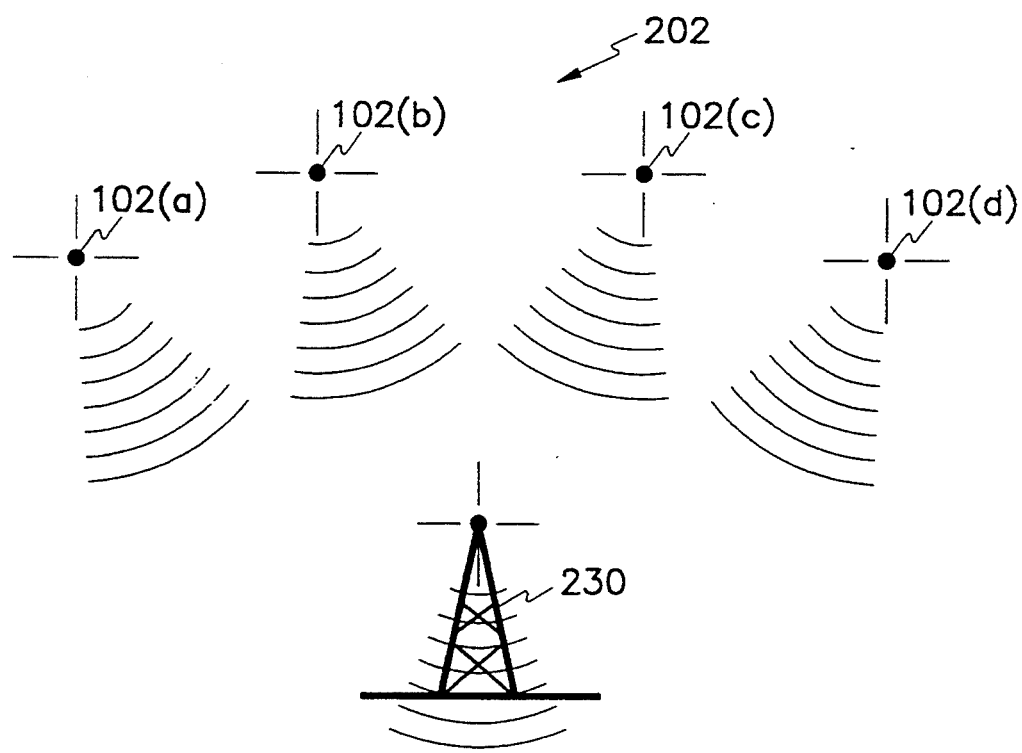
FIG. 2 is a diagram illustrating an autonomous vehicle system which includes a constellation of four GPS satellites, a pseudolite, a base station, and an autonomous vehicle.
Figure 2:
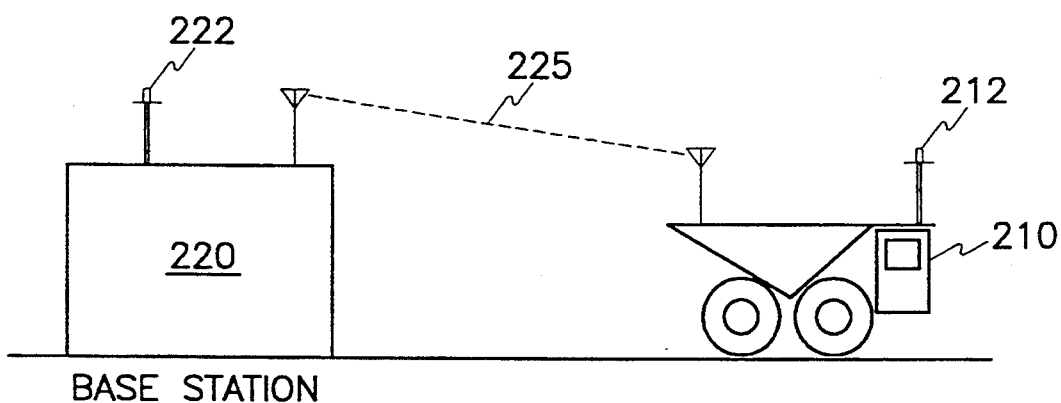

The invention is described in the environment of an autonomous vehicle system 200 as shown in FIG. 2. A representative GPS constellation 202 includes four GPS satellites 102(a)–102(d) for transmitting GPS data. A vehicle (e.g., an autonomous mining truck) 210 and a base station 220 are adapted to receive the GPS data/navigation signals from each GPS satellite 102 in the constellation using respective GPS antennas 212 and 222.

A GPS receiver can receive GPS navigation signals from a satellite which is "in view" of the receiver (i.e., line of sight communications). For example, "in view" may be defined as any satellite that is at least ten degrees up from the horizon. The ten degree angle provides a buffer zone between a useful, in view satellite and a satellite which is just passing out of view below the horizon.

A "constellation" is a group of satellites selected from the satellites "in view" of a GPS receiver. For example, four satellites may be selected from a group of six which are in view of a GPS receiver. The four satellites are normally selected because of a favorable geometry for triangulation (discussed below).

Base station 220 includes a GPS receiver (i.e., a reference receiver) which is located at a known, fixed position. Base station 220 communicates with vehicle 210 over communications channel 225.

Communication channel 225 represents the communications link between base station 220 and vehicle 210. In the preferred embodiment, communication channel 225 comprises radio transceivers. Communication channel 225 is used to transfer data between base station 220 and vehicle 210.

System 200 may optionally include one or more pseudolites 230. A "pseudolite" is a transmitting system located on or near the Earth's surface which emulates a GPS satellite. Because a pseudolite has a fixed, known position, it can greatly enhance the position estimates derived from GPS. For ease of discussion herein, only GPS satellites 102 will be referenced. It should be understood, however, that where position data from a satellite is required, pseudolite data may be substituted.

Figure 3:
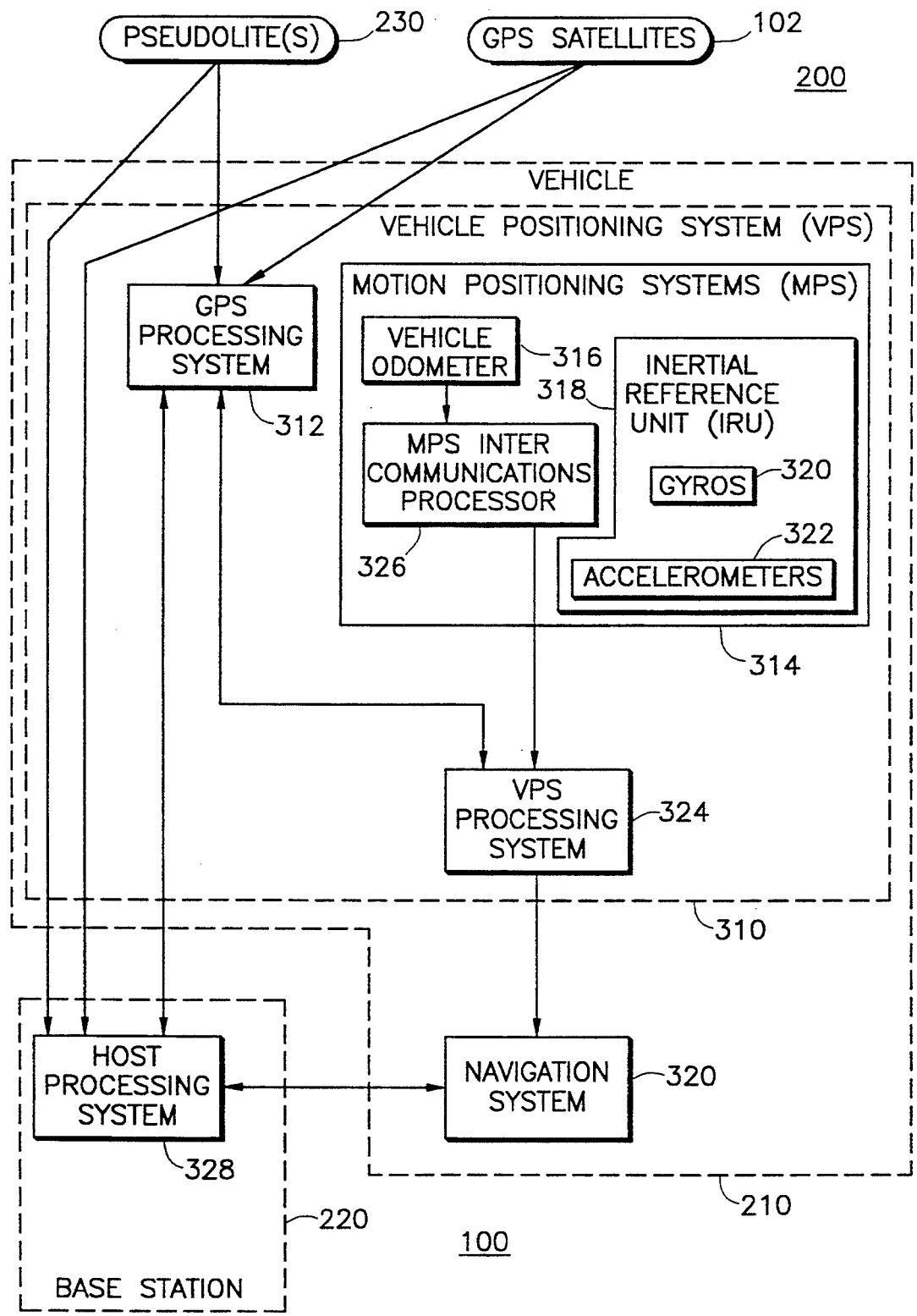
FIG. 3 is a block diagram of the autonomous vehicle system detailing the vehicle positioning system of the autonomous vehicle.

FIG. 3 shows a high-level block diagram of system 200 of the invention, including GPS satellites 102, vehicle 210, base station 220, and pseudolites 230. Vehicle 210 includes a vehicle positioning system (VPS) 310 and a navigation system 320.

Vehicle Positioning System (VPS) 310

The task of guiding vehicle 210 along a prescribed path requires, among other things, an accurate estimate of the vehicle's current position relative to some reference point. Once the current position is known, vehicle 210 can be commanded to proceed to its next destination. VPS 310 allows position estimates of vehicle 210 to be determined with extreme precision.

VPS 310 includes a GPS processing system 312 and a motion positioning system (MPS) 314. GPS processing system 312 receives GPS data, i.e., navigation signals, from GPS satellites 102 and computes a first position estimate (FPE) for vehicle 210 therefrom. MPS 314 includes a vehicle odometer 316 and an inertial reference unit (IRU) 318 which track the position of the vehicle based on changes from an initial known position. MPS 314 produces (the actual computations are done in VPS processing system 324) a second position estimate for vehicle 210. The first position estimate and the second position estimate are independently derived.

The first position estimate (from GPS) may be used as an independent indication of the position of vehicle 210. Similarly, the second position estimate (from MPS) may be used as an independent indication of the position of vehicle 210. In the preferred embodiment, however, the first and second position estimates are combined by a VPS processing system 324 (as discussed below) to produce a more accurate third or best position estimate.

Navigation System 320

Navigation system 320 receives the third position estimate from VPS 314. Navigation system 320 uses this precise, third position estimate to accurately navigate vehicle 210.

GPS Processing System 312

Figure 4:
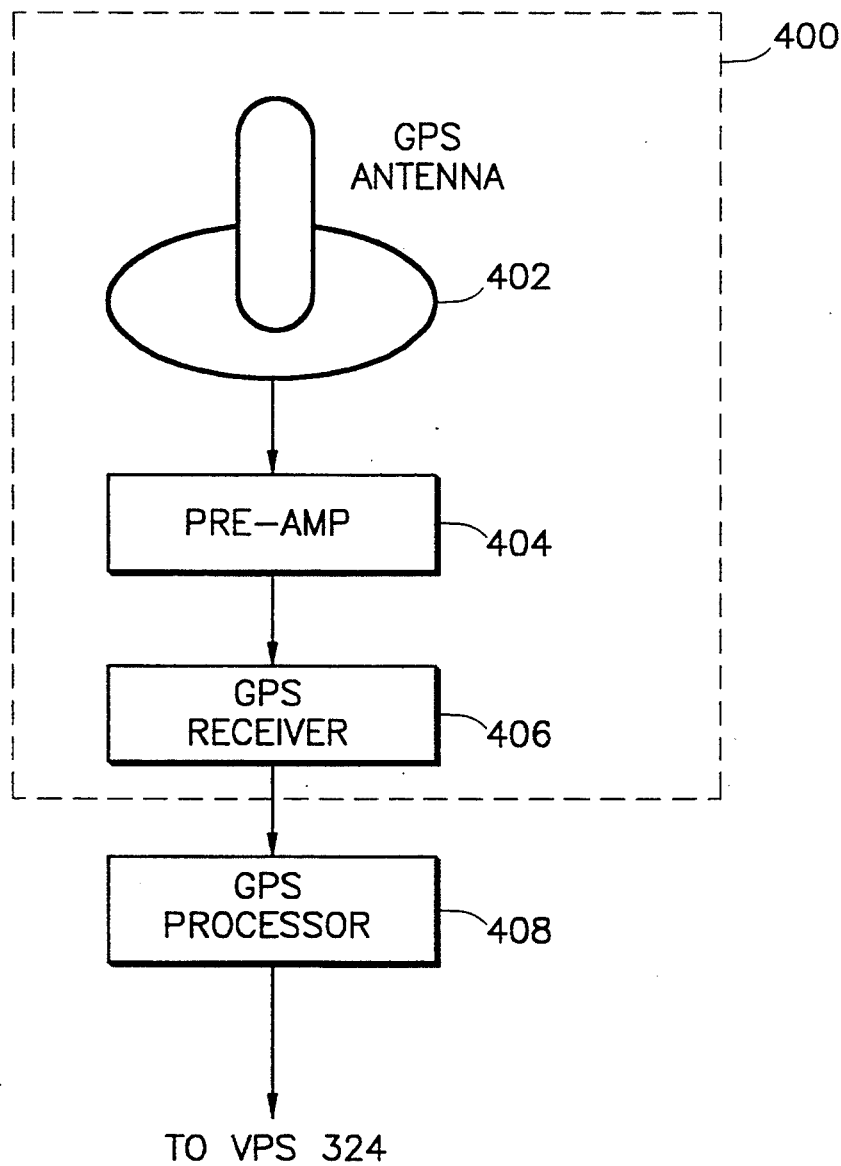
FIG. 4 is a block diagram of a GPS processing system.

GPS processing system 312 is the heart of system 200. With reference to FIG. 4, GPS processing system 312 includes a receiver system 400 and a GPS processor 408. Receiver system 400 receives and decodes the navigation signals from the satellites. GPS processor 408 then uses the information from receiver system 400 to compute the first position estimate.

Receiver system 400 includes a GPS antenna 402, a preamplifier 404, and a GPS receiver 406. Antenna 402 is adapted to receive electromagnetic radiation in the radio portion of the spectrum. Preamplifier 404 amplifies a GPS navigation signal received by GPS antenna 402 from a selected GPS satellite. GPS receiver 406 is a multi-channel receiver which decodes the GPS navigation signals and produces a pseudorange and a satellite position for each selected satellite. GPS processor 408 uses the pseudoranges and satellite positions for a plurality of satellites to calculate the first position estimate for vehicle 210.

In the preferred embodiment, antenna 402 and preamplifier 404 are integrated into a single unit. The combined antenna/preamplifier 402/404 and receiver 406 are available together under part number MX4200 from Magnavox Advanced Products and Systems Co., Torrence, Calif. GPS processor 408 includes an MC68020 microprocessor, available from Motorola, Inc., of Schaumburg, Ill.

Receiver 406 computes a pseudoranges for each satellite as follows. As described above, each signal transmitted by a GPS satellite is continuously encoded with the exact time at which the signal was transmitted. By noting the time at which the signal was received at receiver 406, a propagation time delay can be computed. This time delay when multiplied by the speed of propagation of the signal ($2.9979245998 \times 10^8$ m/s) will yield the pseudorange from the transmitting satellite to the receiver. As discussed above, the range is called a "pseudorange" because the receiver clock is not precisely synchronized to GPS time (causing a clock error) and because propagation through the different layers of the atmosphere changes the speed of the propagating signals (causing an atmospheric error).

GPS receiver 406 may use an almanac to roughly determine the position of a satellite (e.g., for acquisition purposes). For a more precise determination of satellite position, the receiver decodes the GPS navigation signal and extracts ephemeris data therefrom. The ephemeris data indicates the precise position of the transmitting satellite.

GPS processor 408 calculates the first position estimate using the pseudoranges and satellite positions from GPS receiver 406. This is described below with reference to FIG. 5.

Figure 5:
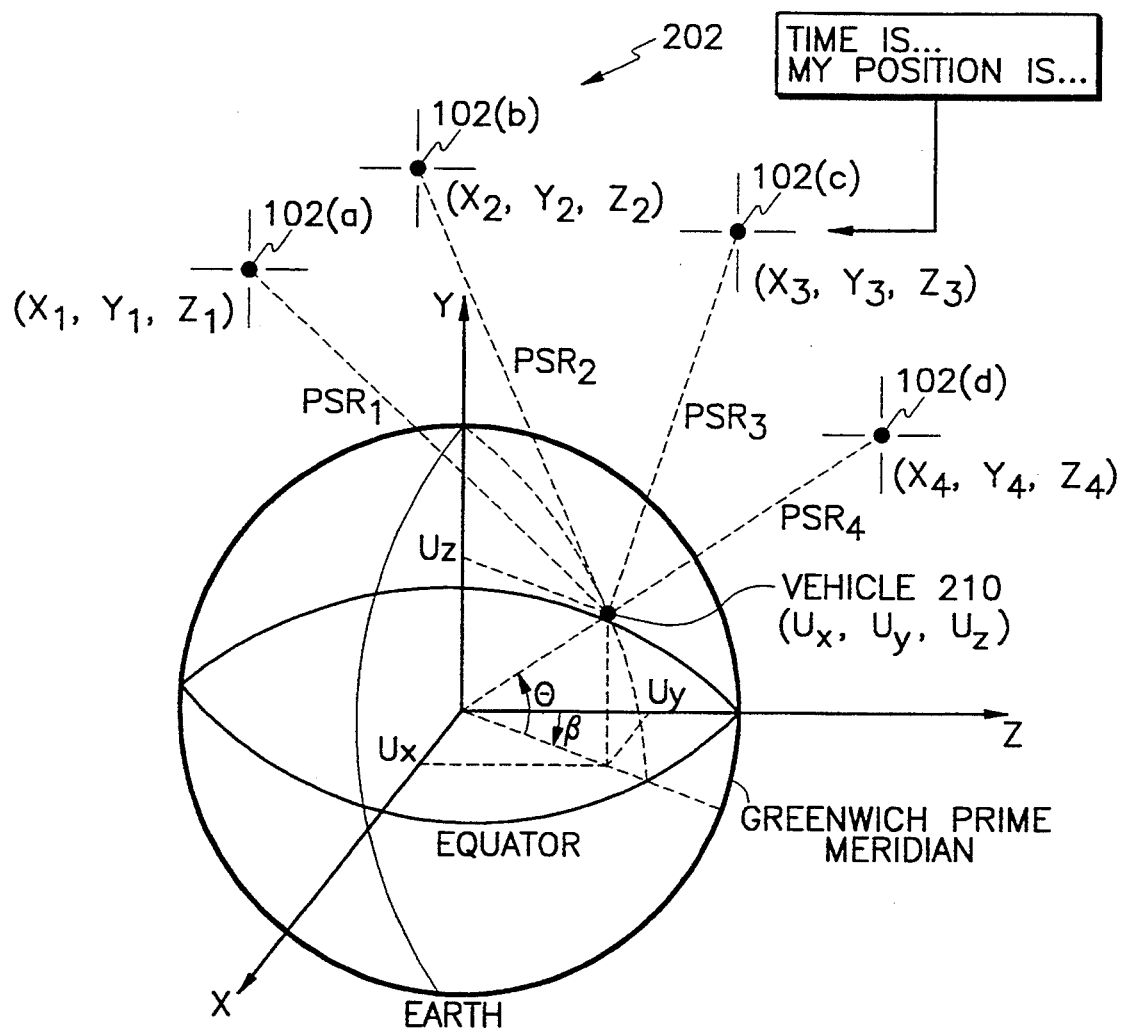
FIG. 5 is a diagram showing the geometric relationship between the center of the Earth, a vehicle near the surface of the Earth and a constellation of GPS satellites.

FIG. 5 shows a sample satellite constellation 202, having GPS satellites 102(a)-102(d), in view of vehicle 210. In Cartesian coordinates, with respect to the center of the Earth, satellite 102(a) is located at $(x_1,y_1,z_1)$; satellite 102(b) is located at $(x_2,y_2,z_2)$; satellite 102(c) is located at $(x_3,y_3,z_3)$; satellite 102(d) is located at $(x_4,y_4,z_4)$; and vehicle 210 is located at a position $(U_x,U_y,U_z)$.

The Cartesian (x,y,z) coordinates of each satellite 102 are determined by GPS receiver 406 using a satellite's ephemeris data. The pseudoranges ($PSR_1$, $PSR_2$, $PSR_3$ and $PSR_4$) between vehicle 210 and each satellite are determined by GPS receiver 406 using transmission time delays. Given this information for at least four satellites, the location of vehicle 210 (i.e., receiver 406) may be determined using the following four distance equations:

$$(x_1-U_x)^2+(y_1-U_y)^2+(z_1-U_z)^2=(PSR_1-B_{clock})^2 \quad \text{EQ. 1}$$

$$(x_2-U_x)^2+(y_2-U_y)^2+(z_2-U_z)^2=(PSR_2-B_{clock})^2 \quad \text{EQ. 2}$$

$$(x_3-U_x)^2+(y_3-U_y)^2+(z_3-U_z)^2=(PSR_3-B_{clock})^2 \quad \text{EQ. 3}$$

$$(x_4-U_x)^2+(y_4-U_y)^2+(z_4-U_z)^2=(PSR_4-B_{clock})^2 \quad \text{EQ. 4}$$

where:

$B_{clock}$ = clock bias

The "clock bias" is a zero order correction factor which attempts to compensate for the clock error discussed above.

Note that there are four unknowns in these equations: $U_x$, $U_y$, $U_z$, and $B_{clock}$. Note also that each satellite produces an equation. Thus, we have four satellites and four unknowns, allowing the equations to be solved for the clock bias ($B_{clock}$) and the position ($U_x,U_y,U_z$) of vehicle 210.

If the clock bias ($B_{clock}$) is eliminated, then only three variables remain in the equation such that only three satellites are necessary to solve for the position of vehicle 210. The clock bias can be eliminated if a high precision clock (e.g., an atomic clock) is used in receiver system 400.

If the latitude (L) and longitude ($\lambda$) of the vehicle are desired, they can be computed using the following equations:

$$\text{Latitude} \approx \cos^{-1}\sqrt{\frac{U_x^2 + U_y^2}{U_x^2 + U_y^2 + U_z^2}} \quad \text{EQ. 5}$$

$$\text{Longitude} = \tan^{-1}\frac{U_y}{U_x} \quad \text{EQ. 6}$$

Note that this latitude equation provides an approximate latitude. Determination of a more exact latitude requires that a complex iterative process be used.

GPS Processing System 312 and Kalman Filtering

From a user's perspective, GPS processing system 312 is the most important part of the autonomous vehicle system 200. GPS processing system 312 is responsible for receiving the signals from each GPS satellite, for selecting the optimal satellites for processing, for determining the precise position of each selected satellite, for determining the pseudorange to each satellite, and ultimately for estimating the position of the receiver based on the satellite positions and the pseudoranges. All of this must be done using received data (of greatly attenuated amplitudes) which is most often heavily corrupted with noise (including noise produced by the atmosphere, the preamplifier and the receiver). GPS processing system 312 relies extensively on Kalman Filtering to eliminate the noise from the GPS navigation signals. Kalman filtering is performed in GPS processor 408.

The Kalman filter is a recursive least-squares algorithm which is normally implemented via software or firmware on a digital computer (processor 408). In the preferred embodiment, the Kalman filter assumes that the noisy signals are discrete rather than continuous in nature. Both the data and noise are modeled in vector form, and the data is processed recursively.

A Kalman filter performs two functions. First, it extrapolates a data estimate from previous data. Second, it updates and refines the extrapolated data estimate based on current data. For example, if a vehicle position $p_1$ and velocity $v_1$ are known at time $t_1$, then the filter (performing the extrapolation step) will use $p_1$ and $v_1$ to estimate a position $p_2$ at a time $t_2$. Thereafter (performing the update step), newly acquired data at time $t_2$ is used to refine the position estimate $p_2$. Data which is fed to the Kalman filter to aid in either the extrapolation or the update/refinement steps is said to "constrain" the filter.

Kalman filtering is well known in the art. For a more detailed discussion on Kalman filtering, see Brown, R. G., "Kalman Filtering: A Guided Tour," Iowa State University; and Kao, Min H. and Eller, Donald H., "Multiconfiguration Kalman Filter Design for High-Performance GPS Navigation," *IEEE Transactions on Automatic Control*, Vol. AC-28, No. 3, March 1983, the relevant teachings of which are incorporated by reference.

Conventionally, because the Kalman filter is a linear filter, the distance equations set forth above are not solved directly, but are first linearized. That is, the equations are differentiated and the derivative of each equation is solved in order to compute a change from a last known position. For example, a first position estimate at time $t_i$ can be rapidly computed by GPS processor 410 by differentiating the navigation equations and solving for a change in position $(\Delta U_x, \Delta U_y, \Delta U_z)$ from a last known vehicle position $(U_x, U_y, U_z)_{i-1}$ at $t_{i-1}$. This greatly simplifies the solution of the distance equations.

As an alternative to Kalman filtering, least squares estimation or best fit polynomial matching may be used.

Base Station 220

GPS data from constellation 202 of GPS satellites 102 is also received by base station 220. Base station 220 comprises a host processing system 328. Host processing system 328 is similar to GPS processing system 312 of vehicle 210 in that it contains a GPS receiver (e.g., a Magnavox model MX4818) for determining the position of the base station with respect to the center the Earth. The base station is used to make a "differential GPS system".

In a differential GPS system, a GPS computed position of the base station is used in conjunction with the known position of the base station to compute biases. By producing a bias or correction factor for each pseudorange, the base station can quantify and correct errors present in the first position estimate.

The base station can compute biases in a variety of ways. In the preferred embodiment, the GPS computed pseudorange from each satellite is compared to a computed distance (d) between the satellite and the known position of base station 220. The difference is a "differential bias" caused by atmospheric and other errors as discussed above. The base station computes a bias for each satellite used in the position computations. These biases, when communicated to the vehicle over communication channel 225, can be used to improve the accuracy of first position estimate.

The distance (d) between a satellite at a position (x,y,z) and a base station at a position $(B_x, B_y, B_z)$ is computed using the standard distance equation:

$$(x-B_x)^2 + (y-B_y)^2 + (z-B_z)^2 = d^2 \qquad \text{EQ. 7}$$

The position (x,y,z) of the satellite is computed from the satellite's ephemeris data.

The differential GPS system assumes that vehicle 210 is located relatively close to base station 220, e.g., within 40 km, such that the atmospheric errors present at base station 220 are approximately the same as the atmospheric errors present at vehicle 210. This allows the vehicle to correct, i.e., improve the accuracy of, the vehicle's first position estimate based on information generated at the base station.

Motion Positioning System (MPS) 314

As discussed above, MPS 314 includes a vehicle odometer 316 and an inertial reference unit (IRU) 318 which track the position of the vehicle based on changes from an initial known position. The vehicle odometer 316 produces data on the distance travelled by vehicle 210. The IRU 318 comprises laser gyroscope(s) 320 and accelerometer(s) 322 which can be used to produce position, velocity, roll, pitch and yaw data. MPS 314 provides the IRU data and the odometer data to VPS processing system 324. An MPS inter-communications processor 326 controls the format of the MPS data which is provided to VPS processing system 324. From this data, VPS processing systems 324 produces a second position estimate for vehicle 210.

VPS Processing System 324

As mentioned above, the first position estimate (from GPS) may be used as an independent indication of the position of vehicle 210. Similarly, the second position estimate (from MPS) may be used as an independent indication of the position of vehicle 210. In the preferred embodiment, however, the first and second position estimates are combined by VPS processing system 324 to produce a more accurate third or best position estimate. To accomplish this, VPS processing system relies on Kalman filtering and on weighted averaging to optimally combine the data from GPS processing system 312 with the data from MPS 314.

While the best position estimate (BPE) is a fairly accurate estimate of vehicle position, it is not perfect. The first position estimate (FPE) (which is the key data involved in determining the position of a vehicle) includes errors which are not completely compensated/corrected for by the differential system and other local errors (local to the vehicle). For example, the atmospheric errors (which are corrected using a linear bias from base station 220) are non-linear. Similarly, the clock bias is a linear approximation to a non-linear error.

In order to improve precision, it is important that position estimates properly compensate for these non-linear errors. What is needed is additional information which is available locally to the vehicle to further constrain the vehicle position estimate computations so that the non-linear errors may be properly corrected.

Figure 6:
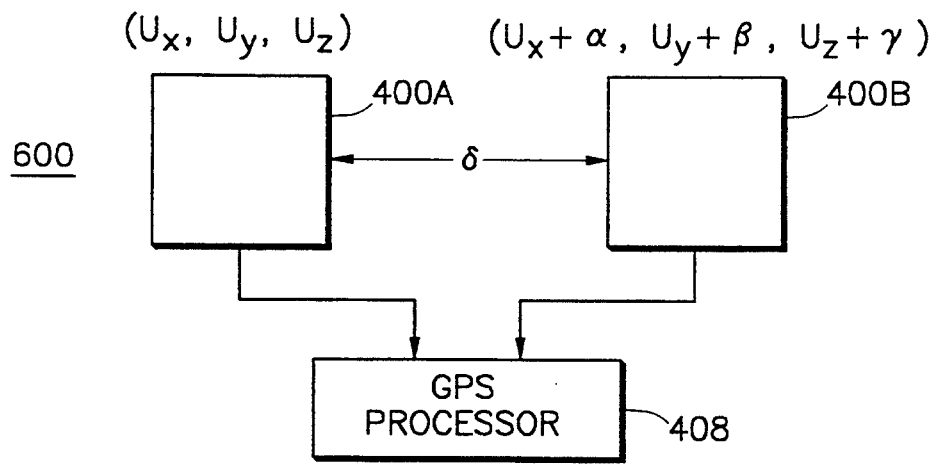
FIG. 6 is a block diagram of the GPS processing system of the invention.

An additional piece of data provided by the present invention is a distance $\delta$ between two receiver systems mounted on vehicle 210. This is illustrated in GPS processing system 600 of FIG. 6.

GPS processing system 600 replaces GPS processing system 312. GPS processing system 600 includes a first receiver system 400A, a second receiver system 400B, and a GPS processor 408. GPS processor 408 and each receiver system 400 are identical to that of GPS processing system 312.

Receiver system 400A is mounted on the vehicle at a first position $(U_x, U_y, U_z)$. Receiver system 400B is mounted on the vehicle at a second position $(U_x+\alpha, U_y+\beta, U_z+\gamma)$. Receiver systems 400A,400B are separated by a fixed, known distance $\delta$, where:

$$\delta = \sqrt{\alpha^2 + \beta^2 + \gamma^2} \qquad \text{EQ. 8}$$

Thus, $\alpha$ represents the $\Delta x$ between receiver systems 400A,400B; $\beta$ represents the $\Delta y$ between receiver systems 400A,400B; and γ represents the Δz between receiver systems 400A,400B.

This data, represented by Equation 8, may be used in conjunction with Equations 1–4 to produce a new set of equations to solve for vehicle position. Since two receivers are being used, however, each satellite will now produce two equations rather than one. For example, given a satellite $SV_i$, the following two distance equation result:

$$(x_i - U_x)^2 + (y_i - U_y)^2 + (z_i - U_z)^2 = (PSR_{iA} - B_{clockA})^2 \quad \text{EQ. 9}$$

(for receiver system 400A)

$$(x_i - U_x - \alpha)^2 + (y_i - U_y - \beta)^2 + (z_i - U_z - \gamma)^2 = (PSR_{iB} - B_{clockB})^2 \quad \text{EQ. 10}$$

(for receiver system 400B)

Note that $B_{clockA}$ is the clock bias for receiver system 400A. Note that $B_{clockB}$ is the clock bias for receiver system 400B.

These two distance equations contain eight unknowns: the position coordinates of receiver system 400A ($U_x, U_y, U_z$), the position coordinates of receiver system 400B ($U_x + \alpha, U_y + \beta, U_z + \gamma$), and the two clock biases ($B_{clockA}$ and $B_{clockB}$). The position of the satellite ($x_i, y_i, z_i$), the pseudorange to the satellite ($PSR_i$) and the distance (δ) between the receiver systems 400A,400B are all known.

Since each satellite yields two distance equations, a total of four satellites ($SV_1$, $SV_2$, $SV_3$ and $SV_4$) can be used to produce the following eight equation:

$$(x_1 - U_x)^2 + (y_1 - U_y)^2 + (z_1 - U_z)^2 = (PSR_{1A} - B_{clockA})^2 \quad \text{EQ. 11}$$

$$(x_1 - U_x - \alpha)^2 + (y_1 - U_y - \beta)^2 + (z_1 - U_z - \gamma)^2 = (PSR_{1B} - B_{clockB})^2 \quad \text{EQ. 12}$$

$$(x_2 - U_x)^2 + (y_2 - U_y)^2 + (z_2 - U_z)^2 = (PSR_{2A} - B_{clockA})^2 \quad \text{EQ. 13}$$

$$(x_2 - U_x - \alpha)^2 + (y_2 - U_y - \beta)^2 + (z_2 - U_z - \gamma)^2 = (PSR_{2B} - B_{clockB})^2 \quad \text{EQ. 14}$$

$$(x_3 - U_x)^2 + (y_3 - U_y)^2 + (z_3 - U_z)^2 = (PSR_{3A} - B_{clockA})^2 \quad \text{EQ. 15}$$

$$(x_3 - U_x - \alpha)^2 + (y_3 - U_y - \beta)^2 + (z_3 - U_z - \gamma)^2 = (PSR_{3B} - B_{clockB})^2 \quad \text{EQ. 16}$$

$$(x_4 - U_x)^2 + (y_4 - U_y)^2 + (z_4 - U_z)^2 = (PSR_{4A} - B_{clockA})^2 \quad \text{EQ. 17}$$

$$(x_4 - U_x - \alpha)^2 + (y_4 - U_y - \beta)^2 + (z_4 - U_z - \gamma)^2 = (PSR_{4B} - B_{clockB})^2 \quad \text{EQ. 18}$$

These eight equations can then be solved in conjunction with Equation 8 to arrive at a more precise vehicle position estimate. The additional constraint, δ, helps the position computations to converge on the more precise solution.

In an alternate embodiment, the orientation (α,β,γ) between receiver systems 400A,400B may be accurately known. For example, the components (α,β,γ) of distance δ could be determined using IRU 318. If so, then only five unknowns remain in Equations 9 and 10. Two satellites could be used in conjunction with the two receivers and Equation 8 to produce the five equations necessary to compute an accurate vehicle position. If more than two satellites are used, then the additional equations would be available to more accurately account for the clock bias.

Figure 7:
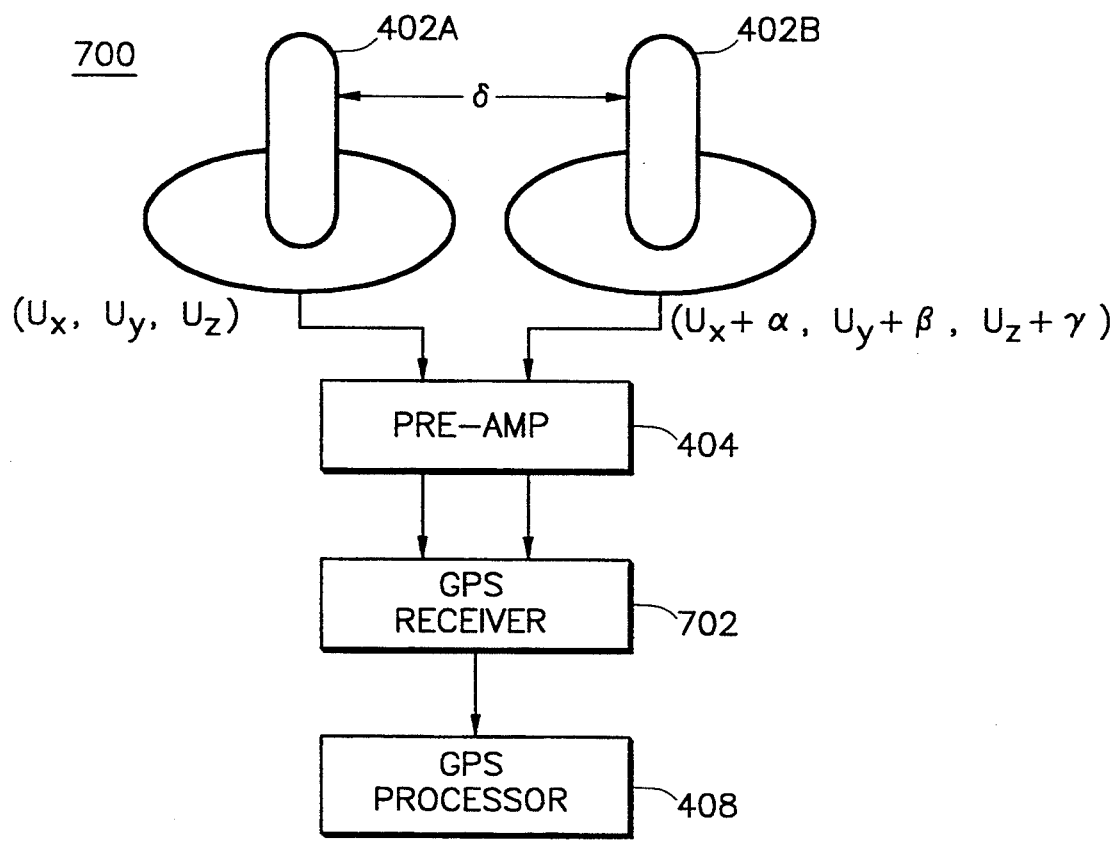
FIG. 7 is a block diagram of an alternate embodiment of the GPS processing system of the invention.

Another embodiment of the invention is shown in FIG. 7. In this embodiment, a GPS processing system 700 includes two antennas 402, a preamplifier 404, and a single GPS receiver 702. Antennas 402A,402B are coupled to the vehicle and spaced apart by a distance δ. GPS receiver 702 computes a satellite position for each satellite and a pseudorange for each antenna. If it is desired to gather data and compute pseudoranges for a plurality of antennas 402 contemporaneously, then GPS receiver 702 must be capable of very fast processing and must time multiplex the signals from the plurality of antennas 402. However, it is not required that the data from the plurality of antennas be gathered contemporaneously. In fact, data from the satellites can be gathered at different times at each antenna.

Since GPS processing system 700 has only one GPS receiver, only one clock bias will be present. That is, $B_{clockB}$ is eliminated. Thus, given a satellite $SV_i$, the following two distance equations will result:

$$(x_i - U_x)^2 + (y_i - U_y)^2 + (z_i - U_z)^2 = (PSR_{iA} - B_{clock})^2 \quad \text{EQ. 19}$$

(for antenna 402A)

$$(x_i - U_x - \alpha)^2 + (y_i - U_y - \beta)^2 + (z_i - U_z - \gamma)^2 = (PSR_{iB} - B_{clock})^2 \quad \text{EQ. 20}$$

(for antenna 402B)

These two distance equations contain seven unknowns: the position coordinates of receiver system 400A ($U_x, U_y, U_z$), the position coordinates of receiver system 400B ($U_x + \alpha, U_y + \beta, U_z + \gamma$), and the clock bias ($B_{clock}$). The position of the satellite ($x_i, y_i, z_i$), the pseudorange to the satellite ($PSR_i$) and the distance (δ) between antennas 402A,402B are all known.

Since each satellite yields two distance equations, a total of three satellites ($SV_1$, $SV_2$ and $SV_3$) can be used to produce the following six equations:

$$(x_1 - U_x)^2 + (y_1 - U_y)^2 + (z_1 - U_z)^2 = (PSR_{1A} - B_{clock})^2 \quad \text{EQ. 21}$$

$$(x_1 - U_x - \alpha)^2 + (y_1 - U_y - \beta)^2 + (z_1 - U_z - \gamma)^2 = (PSR_{1B} - B_{clock})^2 \quad \text{EQ. 22}$$

$$(x_2 - U_x)^2 + (y_2 - U_y)^2 + (z_2 - U_z)^2 = (PSR_{2A} - B_{clock})^2 \quad \text{EQ. 23}$$

$$(x_2 - U_x - \alpha)^2 + (y_2 - U_y - \beta)^2 + (z_2 - U_z - \gamma)^2 = (PSR_{2B} - B_{clock})^2 \quad \text{EQ. 24}$$

$$(x_3 - U_x)^2 + (y_3 - U_y)^2 + (z_3 - U_z)^2 = (PSR_{3A} - B_{clock})^2 \quad \text{EQ. 25}$$

$$(x_3 - U_x - \alpha)^2 + (y_3 - U_y - \beta)^2 + (z_3 - U_z - \gamma)^2 = (PSR_{3B} - B_{clock})^2 \quad \text{EQ. 26}$$

These six equations can then be solved in conjunction with Equation 8 to arrive at a precise vehicle position estimate.

Alternatively, if the components (α,β,γ) of distance δ are determined using IRU 318 as discussed above, then only two satellites are required for an accurate vehicle position solution.

With any of the embodiments set forth above, a high precision clock (e.g., an atomic clock) may be used in the receiver(s). This will allow the clock bias(es) to be eliminated from the equations set forth above such that the accuracy of the position estimates may be improved.

Any satellite which is not essential to the solution of the equations for a position estimation is redundant. A redundant satellite provides data which can further constrain the vehicle position computations such that accuracy is improved. One way in which redundant satellites can be used to improve accuracy is to permute the combinations of satellites used in the position computations and to average the results of each permutation. This will add additional accuracy to the position computations.

While the invention uses either a plurality of antennas or receiver systems, the following discussion will refer only to a plurality of receivers for ease of reference.

The present invention uses a "reverse" triangulation technique. That is, where conventionally satellites having a known geometry are used to compute the position of a remote vehicle using the geometric principles of triangulation, the invention uses a plurality of receivers having a known geometry to triangulate on one or more satellites. The absolute position of each receiver is not known. However, the positions of the satellites and the geometry of the receivers are known.

Theoretically, the invention may be used to determine the position of a vehicle using a single GPS satellite. This would be done using three receivers (with a precise clock so that the clock bias can be eliminated from the computation). In practice, however, this may not work using the pseudorange computation techniques discussed above. Because the distance between the receivers is much smaller (by a factor between 1,000 and 10,000) than the ranges to the satellite(s), an extreme precision of computation is required. This precision, however, is difficult to achieve because of the many noise sources which limit the precision of the pseudorange computations. As a result, noise may totally corrupt the position estimate computations.

The use of accumulated delta range (ADR) or carrier phase techniques (also known as GPS interferometry) may alleviate the precision problem such that a single satellite may be used to compute a vehicle position estimate. These techniques employ phase measurements of the carrier wavelengths to determine precise satellite range measurements. ADR computation techniques are known in the art.

While ADR's are much more precise than pseudoranges, it should be noted that ADR's are generally not used because of the difficulty in maintaining a continuous cycle count without losing track of the transmitted signal.

Thus, while the invention may be used to reduce the number of satellites required to computed a vehicle position estimate, it is primarily directed to improving the convergence and precision of vehicle position estimates computed using three or more satellites. The greater number of satellites will maintain the precision of the position estimate. Similarly, the greater the number of receivers used according to the invention, the greater will be the accuracy of a vehicle position estimate. As can be imagined, a variety of combinations of satellites and receivers (or antennas) may be used. Thus, while GPS processing systems 600 and 700 are described as having two receiver systems 400 and two antennas 402, respectively, any number of receiver systems 400 or antennas 402 may be used. The number selected will depend on the requirements of the particular navigation system.

Figure 8:
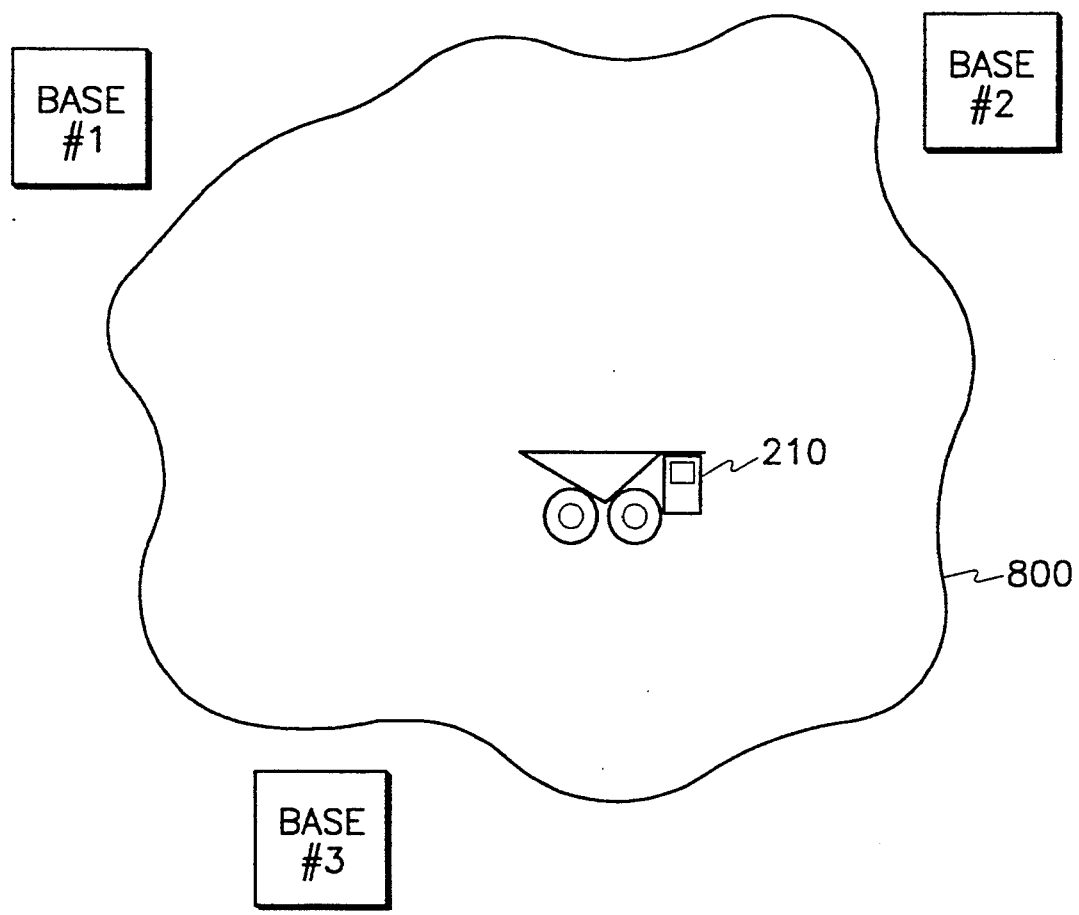
FIG. 8 is a diagram illustrating an autonomous vehicle operating in a worksite which includes a plurality of base stations.

In an alternate embodiment of the invention, a single receiver is used with a plurality of base stations. This is illustrated by way of an example in FIG. 8. In this example, three base stations (base #1, base #2, and base #3) are disposed about an autonomous vehicle worksite 800, such as an open pit mine. A vehicle 210 is shown operating within worksite 800. Vehicle 210 includes a vehicle positioning system 310 having one receiver system 400.

A single base station, e.g., base station #1, may be used with vehicle 210 to improve the accuracy of a vehicle position estimate using a technique known as "double differencing". A variety of double differencing techniques are known. Essentially, double differencing is a method which uses the known position of a base station to constrain a vehicle position estimate for improved precision.

Figure 9:
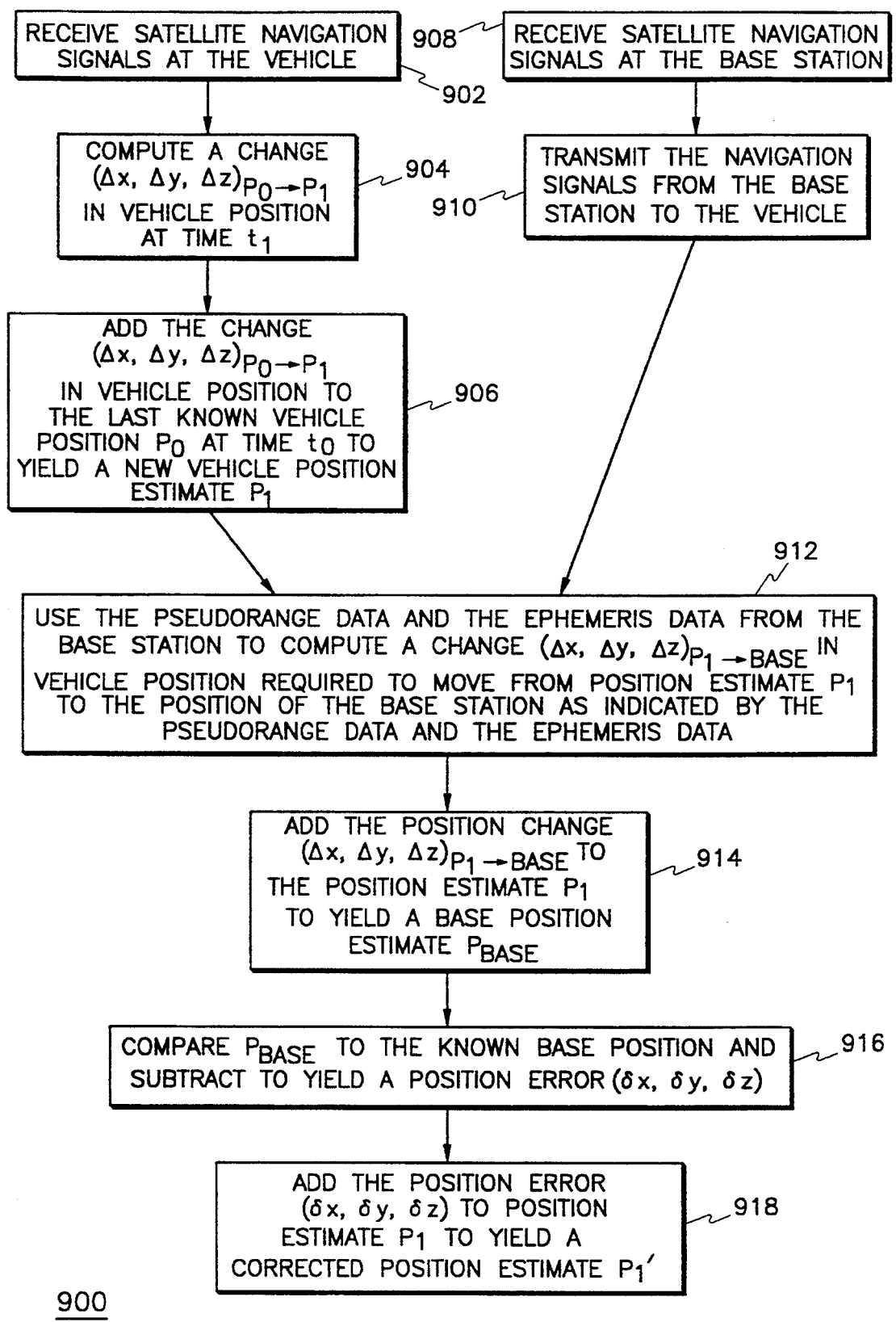
FIG. 9 is a flow chart illustrating a method of double differencing to improve the accuracy of a vehicle position estimate.

FIG. 9 provides an example of a double differencing method 900. In a step 902, navigation signals are received at vehicle 210 which is located at a position $P_1$ at a time $t_1$. A change $(\Delta x, \Delta y, \Delta z)_{P0 \rightarrow P1}$ in vehicle position from a previous position $P_0$ $(U_x, U_y, U_z)_0$ at time $t_0$ to position $P_1$ $(U_x, U_y, U_z)_1$ at time $t_1$ is computed at a step 904. As discussed above, a change in vehicle position is computed rather than an absolute position because the differentiated distance equations are much easier to solve than the normal distance equations. At a step 906, the change $(\Delta x, \Delta y, \Delta z)_{P0 \rightarrow P1}$ in vehicle position is added to the known position $P_0$ of the vehicle at time $t_0$ to produce a vehicle position estimate for position $P_1$.

Concurrent with the computation of a change in vehicle position at the vehicle at time $t_1$, base station #1 receives navigation signals from the GPS satellites and computes its own pseudoranges and satellite positions at a step 908. Base station #1 then transmits, in a step 910, the position data (i.e., pseudoranges and ephemeris data) to vehicle 210 over communications channel 225.

In a step 912, vehicle 210 uses the pseudoranges and the ephemeris data from base station #1 to compute a change $(\Delta x, \Delta y, \Delta z)_{P1 \rightarrow BASE}$ in vehicle position from position $P_1$ at time $t_1$ to the position of base station #1 as indicated by the pseudorange data and the ephemeris data which was transmitted to vehicle 210 from base station #1. The position change $(\Delta x, \Delta y, \Delta z)_{P1 \rightarrow BASE}$ is then added to the computed position estimate $P_1$ of the vehicle at step 914 to produce a computed position estimate $P_{BASE}$ for base station #1.

At a step 916, $P_{BASE}$ is compared to the known position of base station #1 to produce a position error $(\delta x, \delta y, \delta z)$. This position error $(\delta x, \delta y, \delta z)$ is used at a step 918 to refine the computed position estimate $P_1$ of vehicle 210. The end product is a refined vehicle position estimate $P_1'(U_x + \delta x, U_y + \delta y, U_z + \delta z)_1$.

The present invention can be used to expand the concept of double differencing so that a greater precision of vehicle position estimation is achieved. This is realized by using a plurality of base stations to triangulate the position of vehicle 210. This is explained with reference to FIG. 10 for the three base station example of FIG. 8.

In a step 1002, a refined vehicle position estimate $P_1'{}_{BASE\#1}$ for vehicle 210 is computed according to method 900 using base station #1. In a step 1004, the known position $(x_{BASE\#1}, y_{BASE\#1}, z_{BASE\#1})$ of base station #1 and the refined vehicle position estimate $P_1'{}_{BASE\#1}$ $(U_{x1}', U_{y1}', U_{z1}')$ for vehicle 210 are used to determine a distance $(Range_1)$ (like a pseudorange) from the base station to the vehicle as follows:

$$(x_{BASE\#1} - U_{x1}')^2 + (y_{BASE\#1} - U_{y1}')^2 + (z_{BASE\#1} - U_{z1}')^2 = (RANGE_1)^2 \qquad \text{EQ. 27}$$

Steps 1006 and 1008 are substantially identical to steps 1002 and 1004, respectively, but determine a distance (Range$_2$) between the known position ($x_{BASE\#2}$, $y_{BASE\#2}$, $z_{BASE\#2}$) of base station #2 and the refined vehicle position estimate $P_1'_{BASE\#2}$ ($U_{x2}'$, $U_{y2}'$, $U_{x2}'$). Similarly, steps 1010 and 1012 determine a distance (Range$_3$) between the known position ($x_{BASE\#3}$, $y_{BASE\#3}$, $z_{BASE\#3}$) of base station #3 and the refined vehicle position estimate $P_1'_{BASE\#3}$ ($U_{x3}'$, $U_{y3}'$, $U_{z3}'$).

In a step 1014, range$_1$, range$_2$, and range$_3$ and the known positions of the three base stations are used to determine a more precise vehicle position estimate $P_1''$ ($U_x''$, $U_y''$, $U_z''$) by triangulating using the following three equations:

$$(x_{BASE\#1} - U_x'')^2 + (y_{BASE\#1} - U_y'')^2 + (z_{BASE\#1} - U_z'')^2 = (RANGE_1)^2 \quad \text{EQ. 28}$$

$$(x_{BASE\#2} - U_x'')^2 + (y_{BASE\#2} - U_y'')^2 + (z_{BASE\#2} - U_z'')^2 = (RANGE_2)^2 \quad \text{EQ. 29}$$

$$(x_{BASE\#3} - U_x'')^2 + (y_{BASE\#3} - U_y'')^2 + (z_{BASE\#3} - U_z'')^2 = (RANGE_3)^2 \quad \text{EQ. 30}$$

This method of determining a vehicle position using a plurality of base stations will require a considerable amount of additional computation as compared to the open-ended system. (An open-ended system is a non-differential system, i.e., a system using no base stations to improve the accuracy of the GPS generated position estimates.) However, the increase in computation time may be well spent in applications were precision is required. It is anticipated that this embodiment of the invention will result in vehicle position estimates with an error substantially less than one meter.

Currently, multiple base station environments are cost prohibitive for many applications. However, the inventors contemplate that operational environments providing access to three or more base stations will be more readily available in the future.

Figure 10:
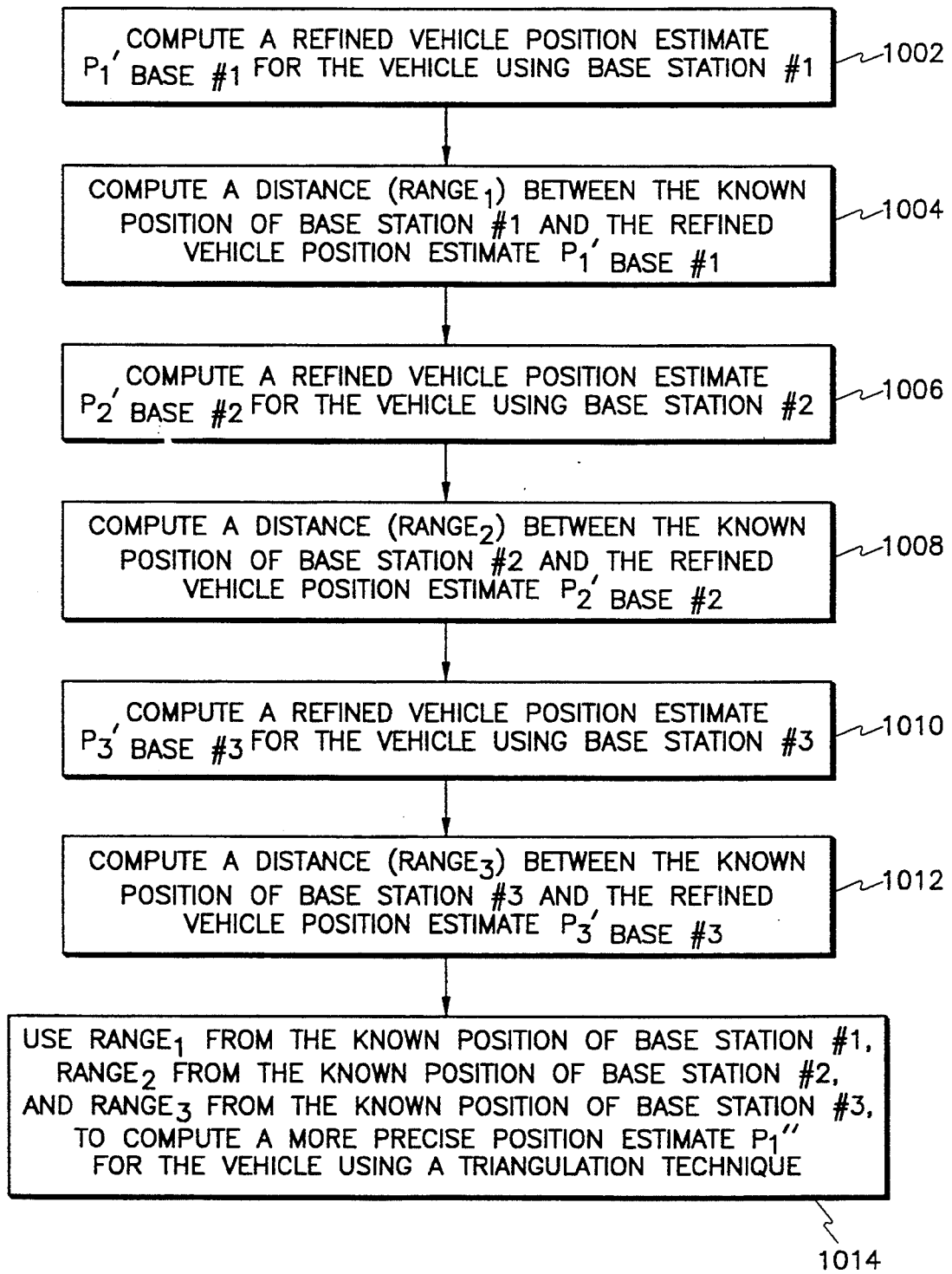
FIG. 10 is a flow chart illustrating the method of the invention for improving the accuracy of a vehicle position estimate by reverse triangulating using a plurality of base stations.
Figure 11:
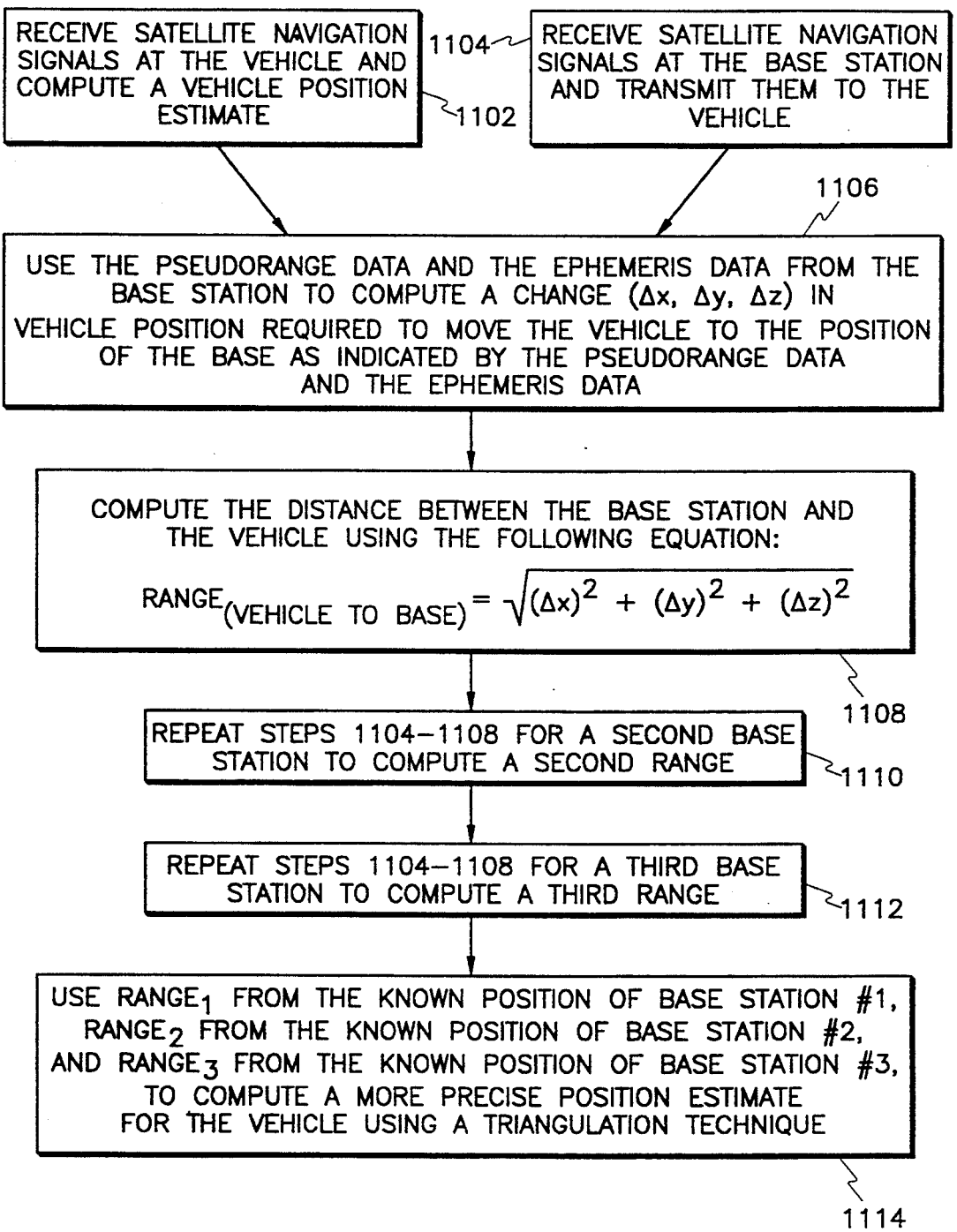
FIG. 11 is a flow chart illustrating an alternate method of the invention for improving the accuracy of a vehicle position estimate by reverse triangulating using a plurality of base stations.

In should be noted that the method of FIGS. 9 and 10 described above for triangulating a vehicle position using a plurality of base stations may be simplified. The range between the known position ($x_{BASE}$, $y_{BASE}$, $z_{BASE}$) of a base station and the refined vehicle position estimate P' ($U_x'$, $U_y'$, $U_z'$) is identical to the distance between the vehicle position estimate P and the estimated base position P$_{BASE}$. This fact may be used to simplify the reverse triangulation method. This is illustrated in the method of FIG. 11.

In a step 1102, a vehicle position estimate for vehicle 210 is computed as set forth in steps 1002-1006 above. Concurrent with the computation of a vehicle position estimate (step 1102), base station #1, in a step 1104, receives navigation signals from the GPS satellites, computes its own pseudoranges and satellite positions, and then transmits the pseudorange and satellite position data to vehicle 210 over communications channel 225.

In a step 1106, vehicle 210 uses the pseudoranges and the ephemeris data from base station #1 to compute a change ($\Delta x, \Delta y, \Delta z$) in vehicle position required to move the vehicle to the position of the base station (as indicated by the pseudorange data and the ephemeris data which was transmitted to vehicle 210 from base station #1). In a step 1108, the distance (Range$_{(vehicle\ to\ base)}$) between the estimated vehicle position and the estimated base position is computed as follows:

$$\text{Range}_{(Vehicle\ to\ base)} = \sqrt{(\Delta x)^2 + (\Delta y)^2 + (\Delta z)^2} \quad \text{EQ. 31}$$

At a step 1110, steps 1104-1108 are repeated for a second base station. At a step 1112, steps 1104-1108 are repeated for a third base station. The result of steps 1102-1112 is a first range (Range$_1$) from an estimated position of a first base station to an estimated position of vehicle 210, a second range (Range$_2$) from an estimated position of a second base station to an estimated position of vehicle 210, and a third range (Range$_3$) from an estimated position of a third base station to an estimated position of vehicle 210.

Finally, at a step 1114, Range$_1$, Range$_2$ and Range$_3$ are used in conjunction with the known positions of the three base stations to determine a more precise vehicle position estimate ($U_x''$, $U_y''$, $U_z''$) by triangulating using Equations 28-30 set forth above.

In another embodiment of the invention, only two base stations may be used to refine the vehicle position estimates. Such a method would proceed substantially as set forth above. However, a two base station embodiment would only be capable of improving the resolution of the vehicle position estimate in two dimensions. For example, if the altitude of the vehicle position is known, then two base stations can be used to refine the latitude and longitude of the vehicle position estimate.

While the invention has been particularly shown and described with reference to a preferred embodiment thereof, it will be understood by those skilled in the art that various changes in form and details may be made therein without departing from the spirit and scope of the invention as defined in the appended claims.

We claim:

1. An apparatus for determining a position of a vehicle near the surface of the Earth using navigation signals from a satellite based navigation system which includes a plurality of satellites orbiting the Earth, the apparatus comprising:

first means, mounted on the vehicle at a first position, for receiving navigation signals from the plurality of satellites, for determining the position of each satellite from a respective first navigation signal, and for computing a first pseudorange for each satellite from said respective first navigation signal, each said first pseudorange representing a distance between said first means and a corresponding one of the plurality of satellites;

second means, mounted on the vehicle at a second position displaced a fixed distance δ from said first position, for receiving navigation signals from the plurality of satellites, for determining the position of each satellite from a respective second navigation signal, and for computing a second pseudorange for each satellite from said respective second navigation signal, each said second pseudorange representing a distance between said second means and a corresponding one of the plurality of satellites; and third means for computing the position of the vehicle based on said positions of said satellites, said first and second pseudoranges, and said fixed distance δ.

2. An apparatus for determining a position of a vehicle near the surface of the Earth using navigation signals from a satellite based navigation system which includes a plurality of satellites orbiting the Earth, the apparatus comprising:

first means, mounted on the vehicle at a first position, for receiving navigation signals from the plurality of satellites;

second means, mounted on the vehicle at a second position displaced a fixed distance δ from said first position, for receiving navigation signals from the plurality of satellites;

third means, electrically connected to said first and second means, for computing a first pseudorange and a first satellite position for each satellite based on the navigation signals received by said first means and a second pseudorange and a second satellite position for each satellite based on the navigation signals received by said second means; and fourth means, electrically connected to said third means, for computing the position of the vehicle based on said first and second satellite positions, said first and second pseudoranges, and said distance δ.

3. A method for determining a position of a vehicle near the surface of the Earth using navigation signals from a satellite based navigation system which includes a plurality of Earth-orbiting satellites, the method comprising the steps of:

(a) receiving a navigation signal from each of the plurality of satellites at a first antenna coupled to the vehicle;

(b) receiving a navigation signal from each of the plurality of satellites at a second antenna coupled to the vehicle, said second antenna being separated from said first antenna by a distance δ;

(c) computing, for each antenna, a satellite position and a corresponding pseudorange for each satellite using the navigation signals; and (d) computing a position of the vehicle relative to the Earth from said satellite positions, said pseudoranges, and said distance δ between said first and second antennas.

4. The method of claim 3, wherein step (c) of computing is performed using a first receiver connected to said first antenna and a second receiver connected to said second antenna.

5. The method of claim 3, wherein step (c) of computing is performed using a single receiver connected to said first and second antennas.

6. A method for determining a position of a vehicle near the surface of the Earth using navigation signals from a satellite based navigation system which includes a plurality of Earth-orbiting satellites, the method comprising the steps of:

(a) receiving navigation signals from each of the plurality of satellites at an antenna coupled to the vehicle;

(b) computing an estimated position of the vehicle from said navigation signals received at the vehicle;

(c) receiving navigation signals from each of the plurality of satellites at a first base station having a known position;

(d) computing a satellite position and a pseudorange to said first base station for each satellite using said navigation signals received at said first base station;

(e) transmitting, to the vehicle from said first base station, said satellite positions and said pseudoranges;

(f) computing a first estimated distance between said first base station and the vehicle using said first estimated position of the vehicle and said satellite positions and pseudoranges received from said first base station;

(g) repeating steps (c)–(f) for a second base station to yield a second estimated distance between said second base station and the vehicle;

(h) repeating steps (c)–(f) for a third base station to yield a third estimated distance between said third base station and the vehicle; and (i) computing, using a triangulation technique, a precise position estimate for the vehicle using said first distance and a known position for said first base station, said second distance and a known position for said second base station, and said third distance and a known position for said third base station.

7. A method for determining a position of a vehicle near the surface of the Earth using navigation signals from a satellite based navigation system which includes a plurality of Earth-orbiting satellites, the method comprising the steps of:

(a) receiving navigation signals from each of the plurality of satellites at an antenna coupled to the vehicle;

(b) computing a vehicle position estimate using said navigation signals received at the vehicle;

(c) refining the vehicle position estimate using a first base station and a double differencing technique to produce a first refined position estimate;

(d) computing a first distance between a known position of said first base station and said first refined position estimate;

(e) repeating steps (c) and (d) for a second base station to produce a second distance;

(f) repeating steps (c) and (d) for a third base station to produce a third distance; and (g) computing a precise vehicle position estimate from said known positions of said first, second and third base stations and said first, second and third distances.

* * * * *